United States Patent [19]

Sakamoto et al.

[11] Patent Number: 4,551,215

[45] Date of Patent: Nov. 5, 1985

[54] CURABLE RESIN COMPOSITION

[75] Inventors: Junichi Sakamoto, Otsu; Hiroshi Fujimoto, Shiga; Hideo Miyake, Otsu, all of Japan

[73] Assignee: Toyo Boseki Kabushiki Kaisha, Osaka, Japan

[21] Appl. No.: 527,934

[22] Filed: Aug. 30, 1983

[30] Foreign Application Priority Data

Sep. 2, 1982 [JP] Japan .................................. 57-152936

[51] Int. Cl.$^4$ ..................... C08J 3/28; C08L 33/00; C08L 63/00
[52] U.S. Cl. ..................... 204/159.23; 204/159.11; 204/159.15
[58] Field of Search ..................... 204/159.15, 159.11, 204/159.23

[56] References Cited

U.S. PATENT DOCUMENTS

| | | | |
|---|---|---|---|
| 4,359,370 | 11/1982 | De La Mare et al. | 204/159.15 |
| 4,387,011 | 6/1983 | Makuuchi et al. | 204/159.15 |
| 4,404,075 | 9/1983 | Ikeda et al. | 204/159.15 |
| 4,409,077 | 10/1983 | Sokiyama et al. | 204/159.15 |

*Primary Examiner*—Allan M. Lieberman

[57] ABSTRACT

A curable resin composition comprising
(I) an epoxy compound having at least two epoxy groups in the molecule,
(II) a component selected from the group consisting of photopolymerizable compound having carboxyl group in the molecule, and the mixture of the photopolymerizable compound and the other photopolymerizable compound, and
(III) a photosensitizer, which provides a cured material having excellent properties such as adhesion, chemical resistance, water resistance, transparency and the like.

3 Claims, No Drawings

CURABLE RESIN COMPOSITION

The present invention relates to a curable resin composition. More particularly, it relates to a curable composition which is cured by active beam such as ultraviolet ray and then completely cured by heat treatment.

Recently, with social needs such as saving of resources, inhibition of environmental pollution and safety, the development of non-solvent type resins, ultraviolet curable resins have actively been promoted.

However, such ultraviolet curable resins generally have a fatal defect in that the resins cannot be cured completely in parts which are difficult to irradiate with ultraviolet and in thick layer parts where the penetration of ultraviolet is not sufficient.

For the purpose of eliminating this defect, there is known an improved method, wherein ultraviolet curing and heat curing with an organic peroxide are combined. According to this method, ultraviolet curing firstly forces the resin to lose fluidity, and then heat curing with an organic peroxide forces the resin to cure completely. The method has been applied in ultraviolet curable paints and the like. However, this method has many defects in that (1) storage stability is bad, (2) adhesion is inferior, (3) resin is readily foamed during heat curing, (4) curing is inhibited by oxygen in the air and the like, because of using an organic peroxide.

As a result of intensive study to eliminate the defects of such conventional ultraviolet curable resins, there has been uncovered a curable resin composition comprising an epoxy compound and a photopolymerizable compound having carboxyl group in the molecule, and a photosensitizer, whereby the defects of the conventional ultraviolet curable resins are solved.

An object of the present invention is to provide an improved curable resin composition which can be cured by both active beam and heat treatment. Another object of the present invention is to provide a curable resin composition which provides a completely cured material having excellent properties such as adhesion, chemical resistance, water resistance, transparency and the like, by using the combination of cure reaction caused by an active beam such as ultraviolet and subsequent complete cure reaction caused by heat treatment. A further object of the present invention is to provide a curable resin composition having excellent storage stability. These and other objects and advantages of the present invention will be apparent to skilled persons in the art from the following description.

The curable resin composition of the present invention comprises (I) an epoxy compound (A) having at least two epoxy groups in the molecule, (II) a component selected from the group consisting of a photopolymerizable compound (B) having carboxyl group in the molecule and a mixture of said compound (B) and another photopolymerizable compound (C), and (III) a photosensitizer.

The cure reaction of the present curable resin composition comprises the first step of the polymerization reaction wherein a photopolymerizable compound (B) having carboxyl group in the molecule or the mixture of said compound (B) and the other photopolymerizable compound (C) are polymerized by irradiation of active beam to give a polymer having carboxyl group, and the second step wherein an epoxy compound (A) is reacted with above polymer having carboxyl group by heating to cure completely. Such cure reaction of the present invention is essentially different from the conventional cure reaction which is produced by ultraviolet alone or a combination of ultraviolet curing and heat curing with an organic peroxide.

With respect to a curable resin composition comprising a combination of an epoxy compound and a photopolymerizable compound, there has hitherto been proposed a photo-curable and heat-curable resin composition which can give cured materials having excellent properties such as flexibility, heat resistance, adhesion and the like. For example, Japanese Patent Laid Open Application No. 101100/1976 describes a curable resin composition containing an epoxy resin and an oligoester acrylate, or a methacrylate and amines having active hydrogen. It is described in this literature that the composition can be cured at a lower temperature to give a relatively flexible cured material, but this composition is remarkably inferior in storage stability because it is a heat-curable resin composition which is cured by utilizing addition reaction of a polyamine having active hydrogen with an acrylate group or methacrylate group, and requires a polyamine having a primary or secondary amino group.

Japanese Patent Publication No. 13572/1982 also describes a photo-curable resin composition containing a polyvalent (meth)acrylate (the term "(meth)acrylate" herein means both acrylate and methacrylate), an epoxy compound and a phosphate having polymerizable unsaturated bond. It is described in this literature that this composition can give a cured material having excellent properties such as flexibility, adhesion and the like, but this composition has a defect that it gives a cured material which is inferior in water resistance because of using a phosphate.

Thus, although there have hitherto been proposed various compositions comprising a combination of an epoxy compound with a (meth)acrylate compound, as described above, these known compositions have significant defects.

It is also one of the characteristics of the present invention that the present composition does not have such significant defects as are observed in the conventional combination of an epoxy compound and (meth)acrylate compounds.

The epoxy compound (A) having at least two epoxy groups in the molecule used in the present invention is an epoxy compound having two or more epoxy groups in the molecule, which epoxy equivalent is 100 to 4,000, preferably 100 to 1,000.

Suitable examples of the epoxy compound (A) are (i) polyglycidyl ethers of di- or more polyhydric phenols, such as bisphenol type epoxy resins (e.g. glycidyl ethers of bisphenol A, bisphenol F, halogenated bisphenol A or the like) and novolak type epoxy resins (e.g. polyglicidyl ethers of phenol novolak, cresol novolak or the like); (ii) polyglycidyl ethers of di- or more polyhydric alcohols (e.g. ethylene glycol, propylene glycol, neopentyl glycol, 1,4-butanediol, 1,6-hexanediol, trimethylolpropane and the like); (iii) polyglycidyl esters of di- or more polyvalent carboxylic acids (e.g. phthalic acid, isophthalic acid, tetrahydrophthalic acid, hexahydrophthalic acid, adipic acid and the like); (iv) polyglycidyl ethers which are obtained by substituting an active hydrogen combined to a nitrogen atom of aniline, isocyanuric acid and the like with a glycidyl group such as N,N-diglycidyl aniline, triglycidyl isocyanurate; (v)

alicyclic polyepoxy compounds such as vinylcyclohexene-diepoxide, 3,4-epoxycyclohexylmethyl-3,4-epoxycyclohexane-carboxylate, 2-(3,4-epoxycyclohexyl)-5,5-spiro(3,4-epoxycyclohexane)-m-dioxane and the like which are obtained by epoxidizing olefin bond in the molecule; (vi) aminopolyepoxy compounds such as N,N,N′,N′-tetraglycidyl- m-xylenediamine, N,N,N′,N′-tetraglycidyl-1,3-bis(aminomethyl)cyclohexane and the like.

Among these, preferred epoxy compounds having at least two epoxy groups in the molecule are diglycidyl ether of bisphenol A, phenol novolak type polyepoxy compound, cresol novolak type polyepoxy compound and the like.

The epoxy compound (A) may be used alone or in combination of two or more kinds thereof. The epoxy compound (A) may also be used in combination with other epoxy compounds having one epoxy group in the molecule such as allyl glycidyl ether, phenyl glycidyl ether and the like.

Suitable examples of a photopolymerizable compound (B) having carboxyl group in the molecule which is another essential component of the present curable resin composition are (i) unsaturated carboxylic acid compounds such as acrylic acid, methacrylic acid, itaconic acid, crotonic acid, fumaric acid; and (ii) compounds of the following general formula (I):

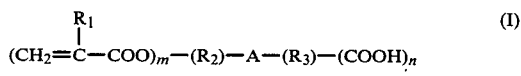

$$(CH_2=\overset{R_1}{\underset{|}{C}}-COO)_m-(R_2)-A-(R_3)-(COOH)_n \quad (I)$$

wherein $R_1$ is hydrogen or methyl group, $R_2$ and $R_3$ are each aliphatic, aromatic or alicyclic hydrocarbon group, A is ester bond, m and n are each positive integers of 1 to 3.

In the above formula (I), $R_2$ is preferably a divalent to tetravalent hydrocarbon group having 2 to 10 carbon atoms or a hydrocarbon group having hydroxy group, and $R_3$ is preferably a divalent to tetravalent aliphatic polybasic acid residue having 2 to 10 carbon atoms, a divalent to tetravalent aromatic polybasic acid residue having 6 to 15 carbon atoms or a divalent to tetravalent alicyclic polybasic acid residue having 6 to 10 carbon atoms.

Examples of the compound of the formula (I) include the following compounds:

(a) compounds of the formula (I) wherein m=1 and n=1: mono(meth)acryloyloxyethyl succinate, mono(meth)acryloyloxyethyl phthalate, mono(meth)acryloyloxyethyl maleate, mono(meth)acryloyloxyethyl tetrahydrophthalate, mono(meth)acryloyloxyethyl hexahydrophthalate, mono(meth)acryloyloxyethyl bicyclo[2,2,1]-5-heptene-2,3-dicarboxylate mono[2-(meth)acryloyloxy-1-(phenoxymethyl)ethyl] tetrahydrophthalate, mono[2-hydroxy-3-methacryloyloxypropyl] phthalate, mono[2-hydroxy-3-methacryloyloxypropyl] succinate and the like;

(b) compounds of the formula (I) wherein m=1 and n=2: mono[2-(meth)acryloyloxyethyl] trimellitate and the like;

(c) compounds of the formula (I) wherein m=1 and n=3: mono[2-(meth)acryloyloxyethyl] pyromellitate and the like;

(d) compounds of the formula (I) wherein m=2 and n=1: mono[2-methacryloyloxy-1-(meth)acryloyloxymethylethyl] phthalate, mono[2-methacryloyloxy-1-(meth)acryloyloxymethylethyl]methyltetrahydrophthalate, mono[2-methacryloyloxy-1-(meth)acryloyloxyethylethyl] tetrahydrophthalate, mono[2-methacryloyloxy-1-(meth)acryloyloxymethylethyl] succinate, and the like;

(e) compounds of the formula (I) wherein m=2 and n=2: mono[2,2-bis(meth)acryloyloxymethylbutyl] trimellitate, mono[3-(meth)acryloyloxy-2-(meth)acryloyloxymethylpropyl] trimelletate and the like;

(f) compounds of the formula (I) wherein m=3 and n=2: mono[3-(meth)acryloyloxy-2,2-bis(meth)acryloyloxy-methylpropyl] pyromellitate and the like;

(g) compounds of the formula (I) wherein m=3 and n=3: mono[3-(meth)acryloyloxy-2,2-bis(meth)acryloyloxy-methylpropyl] pyromellitate and the like.

In the above photopolymerizable compounds (B), the compounds (ii) are preferred. The photopolymerizable compound (B) having carboxyl group in the molecule may be used alone or in combination of two or more kinds thereof, or in combination with one or more kinds of other photopolymerizable compounds (C) as mentioned below.

The photopolymerizable compound (C) used in the present invention should be a compound having an ability to be photopolymerized, which contains one or more photopolymerizable double bonds in the molecule.

Suitable examples of the photopolymerizable compound having one polymerizable double bond in the molecule are (i) styrene compounds such as styrene, α-methylstyrene, chlorostyrene; (ii) alkyl (meth)acrylates such as methyl (meth)acrylate, ethyl (meth)acrylate, n- and iso-propyl (meth)acrylate, n-, sec- and t-butyl (meth)acrylate, 2-ethylhexyl (meth)acrylate, lauryl(meth)acrylate, stearyl (meth)acrylate, tetrahydrofurfuryl (meth)acrylate, cyclohexyl (meth)acrylate; alkoxyalkyl (meth)acrylate, such as methoxyethyl (meth)acrylate, ethoxyethyl (meth)acrylate, butoxyethyl (meth)acrylate; aryloxyalkyl (meth)acrylate such as phenoxyethyl (meth)acrylate; hydroxyalkyl (meth)acrylate such as hydroxyethyl (meth)acrylate; halogen-substituted alkyl (meth)acrylate; polyoxyalkylene glycol mono(meth)acrylate such as polyethylene glycol mono(meth)acrylate, polypropylene glycol mono(meth)acrylate; substituted alkyl mono(meth)acrylate such as alkoxypolyoxyalkylene mono(meth)acrylate; (iii) mono(meth)acrylate of bisphenol A alkylene oxide adduct such as bisphenol A ethylene oxide and/or propylene oxide adduct, mono(meth)acrylate of hydrogenated bisphenol A alkylene oxide adduct such as hydrogenated bisphenol A ethylene oxide and/or propylene oxide adduct; (iv) urethane-modified mono(meth)acrylate having one (meth)acryloyloxy group in the molecule which is prepared by reacting a diisocyanate compound and a compound containing two or more alcoholic hydroxy groups, followed by reacting the resulting compound containing a terminal isocyanate group with an alcoholic hydroxy group-containing (meth)acrylate; (v) epoxy mono(meth)acrylate which is prepared by reacting a compound having one or more epoxy groups in the molecule with acrylic or methacrylic acid; (vi) oligo ester mono(meth)acrylate which is prepared by reacting a carboxylic acid selected from acrylic acid, methacrylic acid and a polycarboxylic acid with an alcohol selected from two or more polyvalent alcohols.

Suitable examples of the photopolymerizable compound having two polymerizable double bonds in the molecule are (i) alkylene glycol di(meth)acrylate, such as ethylene glycol di(meth)acrylate, propylene glycol di(meth)acrylate, 1,4-butanediol di(meth)acrylate, neopentyl glycol di(meth)acrylate, 1,6-hexanediol di(meth)acrylate; polyoxyalkylene glycol di(meth)acrylate, such as diethylene glycol di(meth)acrylate, triethylene glycol di(meth)acrylate, dipropylene glycol di(meth)acrylate, polyethylene glycol di(meth)acrylate, polypropylene glycol di(meth)acrylate; substituted alkylene glycol di(meth)acrylate, such as halogen-substituted alkylene glycol di(meth)acrylate; (ii) di(meth)acrylate to bisphenol A alkylene oxide adduct such as bisphenol A ethylene oxide and/or propylene oxide adduct, di(meth)acrylate of hydrogenated bisphenol A alkylene oxide adduct such as hydrogenated bisphenol A ethylene oxide and/or propylene oxide adduct; (iii) urethane-modified di(meth)acrylate having two (meth)acryloyoxy groups in the molecule which is prepared by reacting a diisocyanate compound with a compound containing two or more alcoholic hydroxy groups, followed by reacting the resulting terminal isocyanate group-containing compound with an alcoholic hydroxy group-containing (meth)acrylate; (iv) epoxy di(meth)acrylate which is prepared by reacting a compound containing two or more epoxy groups in the molecule with acrylic and/or methacrylic acid; (v) oligo ester di(meth)acrylate which is prepared by reacting an unsaturated monocarboxylic acid selected from acrylic acid and methacrylic acid and a polycarboxylic acid with an alcohol selected from two or more polyvalent alcohol.

Suitable examples of the photopolymerizable compound having three or more polymerizable double bonds in the molecule are (i) poly(meth)acrylate of tri- or more polyvalent aliphatic alcohol, such as trimethylolpropane tri(meth)acrylate, trimethylolethane tri(meth)acrylate, pentaerythritol tetra(meth)acrylate; poly(meth)acrylate of tri- or more polyvalent halogen-substituted alcohol; (ii) urethane-modified poly(meth)acrylate containing three or more methacryloyloxy groups in the molecule which is prepared by reacting a diisocyanate compound with a compound containing three or more alcoholic hydroxy groups, followed by reacting the resulting terminal isocyanate group-containing compound with an alcoholic hydroxy group-containing (meth)acrylate; (iii) epoxypoly(meth)-acrylate which is prepared by reacting a compound containing three or more epoxy groups in the molecule with acrylic and/or methacrylic acid.

In the curable resin composition of the present invention, the above-mentioned epoxy compound (A) having at least two epoxy groups in the molecule and the photopolymerizable compound (B) having carboxyl group in the molecule or a mixture of said compound with the photopolymerizable compound (C) are incorporated in an appropriate ratio as mentioned below.

The photopolymerizabel compound (B) having carboxyl group is incorporated in an amount of 10 to 100% by weight, based on the total weight of photopolymerizable compounds. When the compound (B) is incorporated in an amount of less than 10% by weight, the obtained cured material can not have sufficient water resistance.

The epoxy compound (A) having at least two epoxy groups in the molecule and the photopolymerizable compound (B) having carboxyl group in the molecule are incorporated in an equivalent ratio range of epoxy group : carboxyl group = 1:3 to 33:1, preferably in the ratio range of epoxy equivalent : carboxyl equivalent = $(n/m):(6/m)$ to $(3n/m):(1/m)$, wherein m is the number of carboxyl groups in the photopolymerizable compound (B) having carboxyl group in the molecule, n is a positive integer representing the number of epoxy groups in epoxy compound (A), and these being in the range of $1 \leq m$ and $2 \leq n \leq 11$.

When the equivalent ratio of epoxy group: carboxyl group is less than 1:3, that is, the value of epoxy equivalent/carboxyl equivalent is less than 0.33, the obtained cured material has a good transparency, but does not have sufficient hardness. On the other hand, when the equivalent ratio of epoxy group: carboxyl group is more than 33:1, that is, the value of epoxy equivalent/carboxyl equivalent is more than 33, there cannot be obtained the desired curable resin composition having good cure properties.

The epoxy compound (A) and the photopolymerizable compound (B) having carboxyl group in the molecule or the mixture of the compound (B) and other photopolymerizable compound (C) are incorporated in the weight ratio range of epoxy compound (A): photopolymerizable compound (B) or (B) +(C)=10:90 to 90:10, preferably 20:80 to 80:20. When the epoxy compound (A) is incorporated in an amount of less than 10% by weight, there can not be obtained the desired cured material having excellent adhesion, chemical resistance, and the like, because there occurs substantially little reaction of photopolymerizable compound (B) having carboxyl group in the molecule with epoxy compound (A). On the other hand, when the epoxy compound (A) is incorporated in an amount of more than 90% by weight, the curable resin composition has higher viscosity, and hence, it lacks processability and can substantially not enjoy the benefit of cure reaction by active beam i.e. fast-curing properties.

The photosensitizer used in the present invention includes all conventional compounds which can promote the photopolymerization reaction of the above photopolymerizable compound, for example, ketals such as benzyldimethyl ketal; benzoins such as benzoin methyl ether, benzoin ethyl ether, benzoin isopropyl ether, benzoin, α-methylbenzoin; anthraquinones such as 9,10-anthraquinone, 1-chloroanthraquinone, 2-chloroanthraquinone, 2-ethylanthraquinone; benzophenones such as benzophenone, p-chlorobenzophenone, p-dimethylaminobenzophenone; propiophenones such as 2-hydroxy-2-methylpropiophenone, 1-(4-isopropylphenyl)-2-hydroxy-2-methylpropiophenone; suberones such as dibenzosuberone; sulfur-containing compounds such as diphenyl disulfide, tetramethylthiuram disulfide, thioxanthon; pigments such as methylene blue, eosine, fluoresceine; or the like, which may be used alone or in combination of two or more kinds thereof.

The photosensitizer used in the present invention is incorporated into the resin composition in an amount of 0.05 to 20% by weight, preferably 0.5 to 10% by weight, based on the whole weight of the epoxy compound (A) and the photopolymerizable compound.

When it is necessary to accelerate the reaction of the epoxy group and carboxyl group, there may be effectively incorporated a reaction accelerator. Suitable examples of the reacting accelerator are imidazoles such as 2-methylimidazole, 2-ethylimidazole, 2,4-dimethylimidazole, 2-ethyl-4-methylimidazole, 2-undecylimidazole, 2-heptadecylimidazole, 1-vinyl-2-methylimidazole, 2-phenylimidazole, 1-vinyl-2-ethylimidazole, imidazole, 2-phenyl-4-methylimidazole, 1-vinyl-2,4-dimethylimidazole, 1-vinyl-2-ethyl-4-methylimidazole 1-benzyl-2-methylimidazole; tertiary amines such as benzyldimethylamine, 2,4,6-trimethylaminophenol, triethanolamine, triethylamine, N,N'-dimethylpiperidine, α-methylbenzyldimethylamine, N-methylmorpholine, dialkylaminoethanol, dimethylamino-methylphenol, N,N-diethylaminoethanol; tertiary amine salts such as triacetate or tribenzoate of tri(dimethylamino-methyl)phenol, and the like, which may be used alone or in combination of two or more kinds thereof. The reaction accelerator is incorporated into the resin mixture in an amount of 0.05 to 5% by weight, preferably 0.1 to 3.5% by weight, based on the total weight of epoxy compound (A) and photopolymerizable compound.

The present curable resin composition can be readily produced by mixing with stirring the components at room temperature or, if desired, at an elevated temperature. In order to prevent undesirable thermal polymerization during the preparation steps or undesirable dark reaction during storage of the composition, there can be preferably incorporated a conventional thermal polymerization inhibitor such as hydroquinone, hydroquinone monomethyl ether, 1-butylcatechol, p-benzoquinone, 2,5-tert-butylhydroquinone, phenothiazine, and the like. The thermal polymerization inhibitors are incorporated in an amount of 0.001 to 0.1% by weight, preferably 0.001 to 0.05% by weight, based on the weight of the present photopolymerizable compound.

The curing reaction of the curable resin composition is done in two steps which comprise polymerization of the photopolymerizable compound (B) having carboxyl group or a mixture of the compound (B) and other photopolymerizable compound (C) by irradiation of active beam and subsequent reaction of the carboxyl group in the resultant carboxyl group-containing polymer with the epoxy group in the epoxy compound (A) by heating to effect complete curing.

The curable resin composition of the present invention is preferably irradiated with a light of 20 to 200 mW/cm$^2$, for 0.1 second to 15 minutes, and is preferably cured by heating at a temperature of 50° to 160° C. for 10 seconds to 120 minutes.

The curable resin composition can be subjected to casting, printing, coating, encapsulation, potting and the like by the conventional method, followed by irradiating with active beam such as ultraviolet or electron beams to cause the photopolymerization reaction. The irradiation of ultraviolet can be carried out with various light sources, such as sun light, chemical lamp, low pressure mercury-vapor lamp, high pressure mercury-vapor lamp, carbon arc lamp, xenon lamp, metal halide lamp or the like. In the case of curing by irradiation with electron beams, the photosensitizer is not necessarily essential.

The curable resin composition of the present invention shows essentially different curing reaction from those of the conventional ultraviolet curable resin compositions, and of the known ultraviolet-heat curable resin composition utilizing a combination of ultraviolet curing and heat curing with an organic peroxide, and hence, the present curable resin composition can give the cured product which shows the excellent properties such as adhesion, chemical resistance, water resistance, transparency and the like.

The curable resin composition of the present invention has the following excellent characteristics:

(1) The epoxy compound (A) has excellent compatibility with the photopolymerizable compound (B) or the mixture of (B) and (C), and the curable resin composition can be adjusted to desired viscosity and to remarkably low viscosity.

(2) The final cured product has excellent adhesion, chemical resistance, water resistance, transparency and the like.

(3) The performing can readily be carried out by active beam-curing.

(4) The curing at the thick section, which is difficult in the active beam curable resin, can be carried out. Owing to the above benefits, the curable resin composition of the present invention can be utilized in various fields of technique, such as casting or potting, sealing, cementing, paints, inks, adhesives, coatings and the like.

The present invention is further illustrated by the following Examples, but is not limited thereto.

In Examples, "part" and "%" mean part by weight and % by weight respectively unless specified otherwise. The various resin properties of the curable resin composition and the characteristics of cured material therefrom were measured in the following manner.

(1) Viscosity: it was measured with a Brookfield type viscometer at 25° C.

(2) Adhesion: it was measured by the method as described in ASTM D-3356.

(3) Chemical resistance: the cured material was dipped in various reagents at 25° C., and thereafter, the change of appearance was observed after 24 hours.

(4) Barcol hardness: it was measured by the method as described in JIS K6919.

(5) Transparency: it was measured as the transparency of the cured material (thickness: 3 mm) with a spectrophotometer (Type 124, made by Hitachi, Limited) at a wave length of 700 mμ.

EXAMPLE 1

Epikote 828 (bisphenol A type epoxy resin, produced by Shell Chemical Company, 95 parts) monoacryloyloxyethyl succinate (108 parts), benzyldimethyl ketal (1 part) and benzyldimethylamine (1 part) were mixed with stirring at room temperature to give a homogeneous transparent curable resin composition. The resultant curable resin composition has a viscosity of 12.5 poise. The resin composition was put into a space of two glass plates having a spacer (thickness: 3 mm), and then a casting plate (diameter: 70 mm, thickness: 3 mm) was prepared by ultraviolet curing and heating. The ultraviolet irradiation was carried out with super high pressure mercury-vapor lamp (250 W) in the distance of 30 cm for 5 minutes, and heating was carried out at a temperature of 120° C. for 30 minutes. The properties of the obtained casting plate are shown in following Table 1.

TABLE 1

| Example No. | Barcol hardness | Transparency (%) |
| --- | --- | --- |
| 1 | 29 | 67 |

Reference Example 1

The curable resin composition obtained in the Example 1 was put into the space of two glass plates having a spacer (thickness: 3 mm), and then, ultraviolet irradiation was carried out for 5 minutes as described in Example 1. The resulting cured material was a semisolid material.

On the other hand, when the curable resin composition obtained in the Example 1 was put into the space of two glass plates having a spacer (thickness: 3 mm) and subjected to heating at the temperature of 120° C. for 30 minutes, the resin composition was still liquid and curing reaction was not found.

EXAMPLES 2 to 6

Five kinds of homogeneous transparent curable resin compositions having different components shown in Table 2 were prepared from Epikote 828 and monoacryloyloxyethyl succinate as used in Example 1 in the same manner as described in Example 1. The properties of the obtained casting plate by curing reaction were measured in the same manner as described in Example 1. The results are shown in Table 3.

TABLE 2

| Components | Example Nos. | | | | |
|---|---|---|---|---|---|
| | 2 | 3 | 4 | 5 | 6 |
| Epikote 828 (parts) | 57 | 76 | 95 | 138 | 190 |
| (equivalent amount of epoxy group) | (0.30) | (0.40) | (0.50) | (0.73) | (1.0) |
| Monoacryloyloxyethyl succinate (parts) | 184 | 173 | 162 | 138 | 108 |
| (equivalent amount of carboxyl group) | (0.85) | (0.80) | (0.75) | (0.64) | (0.50) |
| (equivalent ratio of epoxy group/carboxyl group) | (0.35) | (0.50) | (0.67) | (1.14) | (2.0) |

TABLE 3

| Properties | Example Nos. | | | | |
|---|---|---|---|---|---|
| | 2 | 3 | 4 | 5 | 6 |
| Viscosity of solution (poise) | 4.4 | 5.3 | 9.1 | 8.2 | 26 |
| Barcol hardness | 5 | 18 | 25 | 31 | 20 |
| Transparency (%) | 59 | 70 | 63 | 67 | 57 |

EXAMPLE 7

Epikote 828 (50 parts) described above, monoacryloyloxyethyl phthalate (50 parts), benzyldimethyl ketal (0.5 part) and benzyl dimethylamine (0.5 part) were mixed with stirring at room temperature to give a homogeneous transparent curable resin composition. The resultant curable resin composition has a viscosity of 860 poise.

A casting plate was prepared from the composition in the same manner as described in Example 1. The properties of the obtained casting plate were measured in the same manner as described hereinbefore. The results are shown in Table 4.

TABLE 4

| Example No. | Barcol hardness | Transparency (%) |
|---|---|---|
| 7 | 39 | 76 |

EXAMPLES 8 to 11

The curable resin compositions shown in Table 5 were respectively coated on an epoxy resin-laminated sheet reinforced with glass cloth (thickness: 1 mm) with a coater at a thickness of about 100 μ, subjected to irradiation of ultraviolet with super high pressure mecury-vapor lamp (250 W) at a distance of 30 cm for 5 minutes, and thereafter, heated at 120° C. for 30 minutes. The adhesions of the obtained coating were measured. The results are shown in Table 5.

TABLE 5

| Components (parts) | Example Nos. | | | |
|---|---|---|---|---|
| | 8 | 9 | 10 | 11 |
| Epikote 828 | 76 | 50 | 47 | 17 |
| Monoacryloyloxyethyl succinate | 43 | 50 | 53 | 33 |
| Diacrylate of bisphenol A ethyleneoxide (4 moles) adduct | 103 | — | — | — |
| Phenol novolak epoxy acrylate | — | 50 | — | 50 |
| Benzyldimethyl ketal | 1.1 | 0.75 | 0.5 | 0.5 |
| Benzyldimethylamine | 1.1 | 0.75 | 0.5 | 0.5 |
| Adhesion (ASTM D-3356) | 100/100 | 100/100 | 100/100 | 100/100 |

EXAMPLE 12

The cured materials obtained in Examples 8 and 11 were tested to measure chemical resistance by dipping into 5% sodium hydroxide, 5% sulfuric acid, trichlene, toluene and isopropanol respectively at 25° C. for 24 hours. Neither swell nor crack were observed, and hence, the cured materials showed excellent chemical resistance.

Besides, the cured materials obtained in Examples 8 and 11 were dipped into boiling water for 16 hours. Neither swell nor crack were observed, and hence, the cured materials showed excellent water resistance.

Reference Examples 2 and 3

The curable resin composition shown in Table 6 was cured in the same manner as described in Examples 8 to 11. The resulting cured materials were dipped into 5% sodium hydroxide, 5% sulfuric acid, trichlene, toluene and isopropanol at 25° C. for 24 hours to test chemical resistance. Besides, the cured materials were dipped into boiling water for 16 hours to test water resistance. The results are shown in Table 7.

TABLE 6

| Components (parts) | Reference Example Nos. | |
|---|---|---|
| | 2 | 3 |
| Epikote 828 | 76 | 50 |
| Hydroxyethyl acrylate | 23 | — |
| Diacrylate of bisphenol A ethyleneoxide (4 moles) adduct | 103 | — |
| Phenol novolak epoxy acrylate | — | 50 |
| Benzyldimethyl ketal | 1.0 | 0.5 |
| Benzyldimethylamine | 1.0 | 0.5 |

TABLE 7

| Reference Example Nos. | Chemical resistance | | | | | Water resistance |
|---|---|---|---|---|---|---|
| | 5% Sodium hydroxide | 5% Sulfuric acid | Trichlene | Toluene | Isopropanol | |
| 2 | no change | no change | swelling | swelling | no change | crack |

TABLE 7-continued

| Reference Example Nos. | Chemical resistance | | | | | Water resistance |
|---|---|---|---|---|---|---|
| | 5% Sodium hydroxide | 5% Sulfuric acid | Trichlene | Toluene | Isopropanol | |
| 3 | no change | no change | no change | no change | no change | crack |

What is claimed is:

1. A curable resin composition which comprises
   (I) an epoxy compound having at least two epoxy groups,
   said epoxy compound being a member selected from the group consisting of polyglycidyl ethers of di- or more polyhydric phenol, polyglycidyl ethers of di- or more polyhydric alcohol, polyglycidyl esters of di- or more polyvalent carboxylic acid, polyglycidyl ethers which are obtained by substituting an active hydrogen combined to a nitrogen atom of aniline or isocyanuric acid, alicyclic polyepoxy compound, and aminopolyepoxy compound,
   (II) a component selected from the group consisting of a photopolymerizable compound having from one to three carboxyl groups in the molecule, and a mixture of not less than 10% by weight of said photopolymerizable compound and at least one other photopolymerizable compound,
   said photopolymerizable compound having from one to three carboxyl groups in the molecule being a compound of the formula:

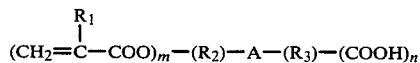

in which $R_1$ is hydrogen or methyl group, $R_2$ and $R_3$ are each aliphatic, aromatic or alicyclic hydrocarbon residues A is on ester bond, m and n are each a positive integer of 1 to 3, and
   (III) a photosensitizer,
   said epoxy compound (I) and component (II) being incorporated in a weight ratio range of 10:90 to 90:10 and in an equivalent ratio range of epoxy group: carboxyl group of 1:3 to 33:1,
   said photosensitizer being incorporated into the resin mixture in an amount of 0.05 to 20% by weight, based on the total weight of the epoxy compound and the photopolymerisable compound,
   said composition being adapted to be subjected to active beam irradiation to polymerize component (II) to form a carboxyl group-containing polymer and thereafter to be subjected to heating to effect reaction of a carboxyl group in the resultant carboxyl group-containing polymer with an epoxy group in the epoxy compound (I) to effect complete curing.

2. A curable resin composition according to claim 1, wherein the epoxy equivalent of the epoxy compound is 100 to 4,000.

3. A curable resin composition according to claim 1, wherein the photosensitizer is a member selected from the group consisting of ketal, benzoin, anthraquinone, benzophenone, suberone, sulfur-containing compound and pigment.

* * * * *

UNITED STATES PATENT AND TRADEMARK OFFICE
CERTIFICATE OF CORRECTION

PATENT NO. : 4,551,215

DATED : November 5, 1985

INVENTOR(S) : Junichi Sakamoto et al.

It is certified that error appears in the above–identified patent and that said Letters Patent are hereby corrected as shown below:

Column 12, line 9, "dues A is on" should be --dues, A is an--.

Signed and Sealed this

Seventh Day of January 1986

[SEAL]

Attest:

Attesting Officer

DONALD J. QUIGG

Commissioner of Patents and Trademarks